United States Patent [19]

Kuo

[11] Patent Number: 4,920,337
[45] Date of Patent: Apr. 24, 1990

[54] DISPLAY APPARATUS

[75] Inventor: Hideo Kuo, Tokyo, Japan

[73] Assignee: Canon Kabushiki Kaisha, Tokyo, Japan

[21] Appl. No.: 106,888

[22] Filed: Oct. 13, 1987

Related U.S. Application Data

[63] Continuation of Ser. No. 660,988, Oct. 15, 1984, abandoned.

[30] Foreign Application Priority Data

Oct. 17, 1983 [JP] Japan .................................. 58-193874
Oct. 17, 1983 [JP] Japan .................................. 58-193875

[51] Int. Cl.$^5$ ............................................ G09G 1/00
[52] U.S. Cl. .................................... 340/721; 340/706; 340/712; 340/734; 364/519
[58] Field of Search ............... 340/721, 724, 747, 706, 340/709, 712, 734; 364/518, 519

[56] References Cited

U.S. PATENT DOCUMENTS

| | | | |
|---|---|---|---|
| 3,879,722 | 4/1975 | Knowlton | 340/712 |
| 4,070,710 | 1/1978 | Sukonick et al. | 340/721 X |
| 4,201,983 | 5/1980 | Mageri et al. | 340/724 X |
| 4,454,592 | 6/1984 | Cason et al. | 340/721 X |
| 4,464,652 | 8/1984 | Lapson et al. | 340/709 |
| 4,481,603 | 11/1984 | McCaskill et al. | 340/721 X |
| 4,509,043 | 4/1985 | Mossaides | 340/721 |
| 4,533,910 | 8/1985 | Sukonick et al. | 340/721 |
| 4,542,378 | 9/1985 | Suganuma et al. | 340/734 |
| 4,550,315 | 10/1985 | Bass et al. | 340/747 |
| 4,555,700 | 11/1985 | Convis et al. | 340/721 |
| 4,586,035 | 4/1986 | Baker et al. | 340/706 |
| 4,688,167 | 8/1987 | Agarwal | 340/747 |

FOREIGN PATENT DOCUMENTS 3121503 3/1982 Fed. Rep. of Germany.

OTHER PUBLICATIONS

"New Display Station Offers Multiple Screen Windows and Dual Data Communications Ports", *Hewlett Packard Journal*, Mar. 1981, pp. 3–8.

"Display Station's User Interface is Designed for Increased Productivity" *Hewlett Packard Journal*, Mar. 1981, pp. 8–12.

*Primary Examiner*—David K. Moore
*Assistant Examiner*—Jeffery A. Brier
*Attorney, Agent, or Firm*—Fitzpatrick, Cella, Harper & Scinto

[57] ABSTRACT

A display apparatus has an original reader or a microfilm file, a CRT, high- and low-speed printers, a point device for indicating a command image, a CPU, a display control unit, and a display memory. More than one display information can be displayed simultaneously on the screen of the CRT, and printing or the like of one information can be performed during display operation of another information.

13 Claims, 7 Drawing Sheets

DISPLAY APPARATUS

This application is a continuation of application Ser. No. 660,988 filed Oct. 15, 1984, now abandoned.

BACKGROUND OF THE INVENTION

1. Field of the Invention

The present invention relates to a display apparatus such as a CRT or a liquid crystal display for displaying a character or picture image and, more particularly, to a display apparatus capable of displaying a plurality of display information on a single display screen.

2. Description of the Prior Art

In a conventional display apparatus such as a CRT, one display information corresponds to a single display screen. When an operator wishes to display a sentence image entered by a wordprocessor or the like and presented as an A4-size image 42 on the screen of a CRT 8 and also wishes to display necessary information 43 on the same screen, the area of the A4-size image 42 is decreased as shown in FIG. 1, and the characters in the A4-size image 42 are also reduced in size, thus degrading readability of the text.

When a document is read and displayed, the size of the read image is decreased, and the readability of the read text is degraded.

In a conventional computer-aided design system, the operator cannot be engaged with any other operation while he performs editing. If the operator wishes to perform any other operation for information other than the currently displayed content, he or she must first finish editing.

SUMMARY OF THE INVENTION

It is an object of the present invention to provide a display apparatus which is free from the conventional drawbacks.

It is another object of the present invention to provide a display apparatus whose display area can be effectively used.

It is still another object of the present invention to provide an improvement in a display apparatus such as a CRT for image editing (e.g., image magnification, image extraction, image synthesis and image entry).

It is still another object of the present invention to provide a display apparatus for displaying all or necessary portions of a plurality of display information on a single screen.

It is still another object of the present invention to provide a display apparatus for displaying an operator information image (to be referred to as a command-/template menu hereinafter) of display information 46' on an A4-size image 42' (to be referred to as an editing image hereinafter) of display information 45 on a CRT screen 44 when a plurality of display information are displayed on a single screen, e.g., when the display information 45 and display information 46 are simultaneously displayed on the single CRT screen 44.

It is still another object of the present invention to provide a display apparatus wherein a display position of the display information 46 is moved downward as indicated in a CRT screen 44' or the display information 46 is completely eliminated from the current screen so as to allow observation of only necessary information when the entire A4-size image of the display information 45 must be observed.

It is still another object of the present invention to provide a display apparatus wherein a plurality of display information of an editing image command menu or a template menu image are associated with respect to each other and are overlapped at any position on single CRT screen, thereby effectively utilizing the display apparatus with a multiwindow function.

It is still another object of the present invention to provide an image processing system capable of performing any other operation such as printing within a short period of time independently of the display operation for image editing.

The above and other objects, features and advantages of the present invention will be apparent from the following detailed description in conjunction with the accompanying drawings.

DETAILED DESCRIPTION OF THE PREFERRED EMBODIMENT

The present invention will be described in detail with reference to the accompanying drawings.

Figure 3:
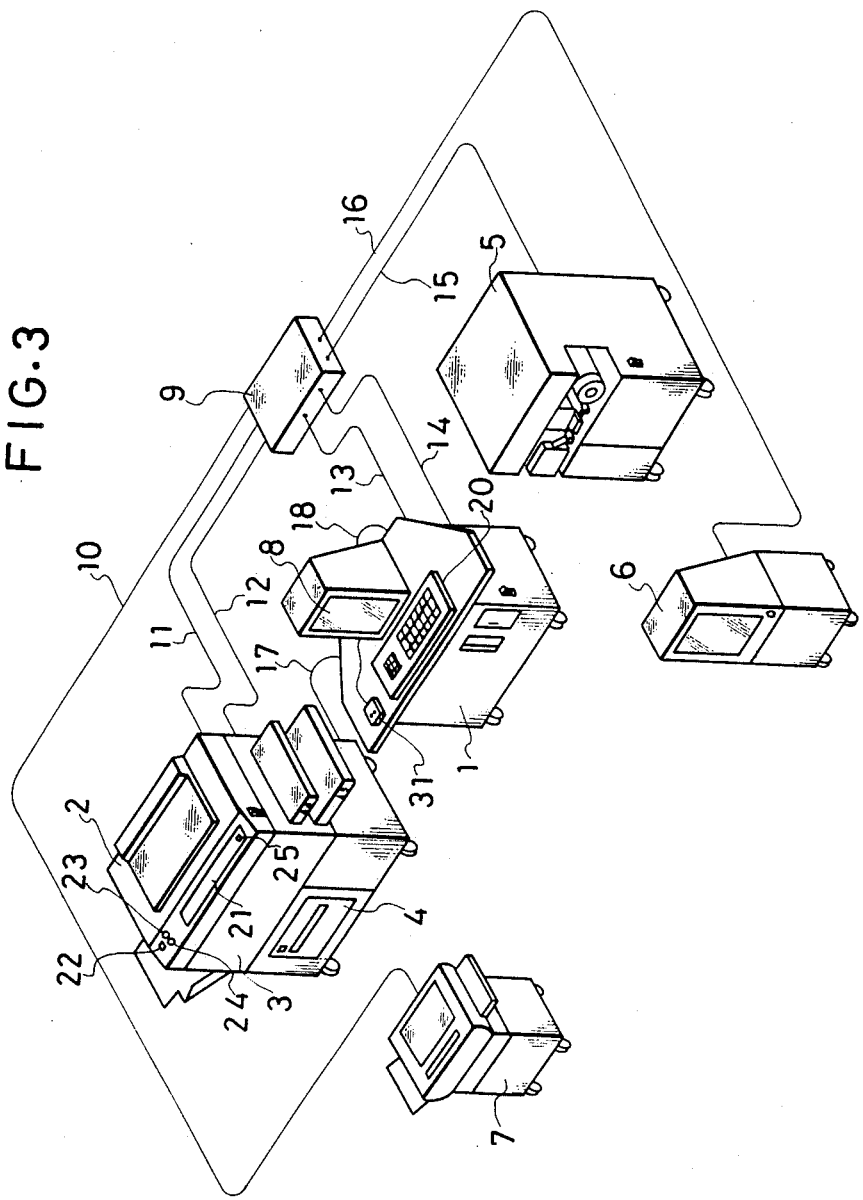
FIG. 3 is a perspective view showing a system configuration of a filing system to which the present invention is applied.

FIG. 3 is a perspective view showing the connection of an image processing system to which the present invention is applied. A control section (to be referred to as a work station hereinafter) 1 has a system control microcomputer, an internal memory such as a RAM or a ROM, and an external memory such as a flopply disk or a cartridge disk. An original reader 2 as an input section of a digital copying machine reads with an image pickup device such as a CCD document information from an original placed on an original table and converts the information into electrical signals. A high speed printer 3 as an output section of the digital copying machine prints on a recording medium based on the electrical signals received and comprises, for example, a laser beam printer. An image file 4 has a recording medium such as an optical disk or an optomagnetic disk and allows write or readout of a large amount of image information. A microfilm file 5 has a microfilm retrieval section and a microfilm reader for converting image information on a microfilm retrieved by the retrieval section into electrical signals by an image pickup element. A soft display 6 has a high resolution and is a photo-sensitive belt consisting of a transparent and electrically conductive belt-like base and a photo-conductive film formed thereon. A laser beam modulated in accordance with an input image signal is irradiated onto the photoconductive layer through the base to form an electrostatic latent image corresponding to the density of image light in the photoconductive layer. The latent image is developed with a toner (developer) having a conductivity and magnetic property and held on a toner carrier. The soft display 6 thus forms a display image. A low speed printer 7 is similar to the printer 3 but has a smaller size and a lower speed than those of the printer 3 and can be included as needed. A CRT 8 displays image information photoelectrically read by a digital copying machine or an input scanner (reader) of the microfilm reader, and control information of the system. A switching (or selecting) unit 9 switches connections between respective input and output devices in accordance with a signal from the work station 1. Cables 10 to 18 electrically connect the respective input and output devices. A keyboard 20 is arranged at the work station 1. An operation command and the like of the system can be entered by operating the keyboard 20. A point device 31 is for pointing to image information on the CRT 8; it moves a cursor image on the CRT 8 in the X- and Y- directions to select a command image in the command menu. A control panel 21 is used to input a control command for the digital copying machine. The control panel 21 has keys for setting the number of copies to be produced or the copying magnification, a copy start key 25 for instructing the copy start, and a numerical indicator. A mode switch 22 and LED indicators 23 and 24 for indicating the selection mode of the switch 22 are arranged next to the control panel 21.

Figure 1:
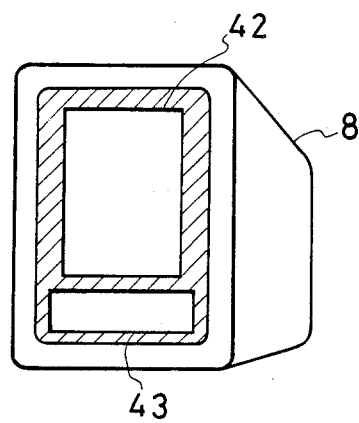
FIG. 1 is a perspective view showing a display state on a screen of a conventional display apparatus.
Figure 4:
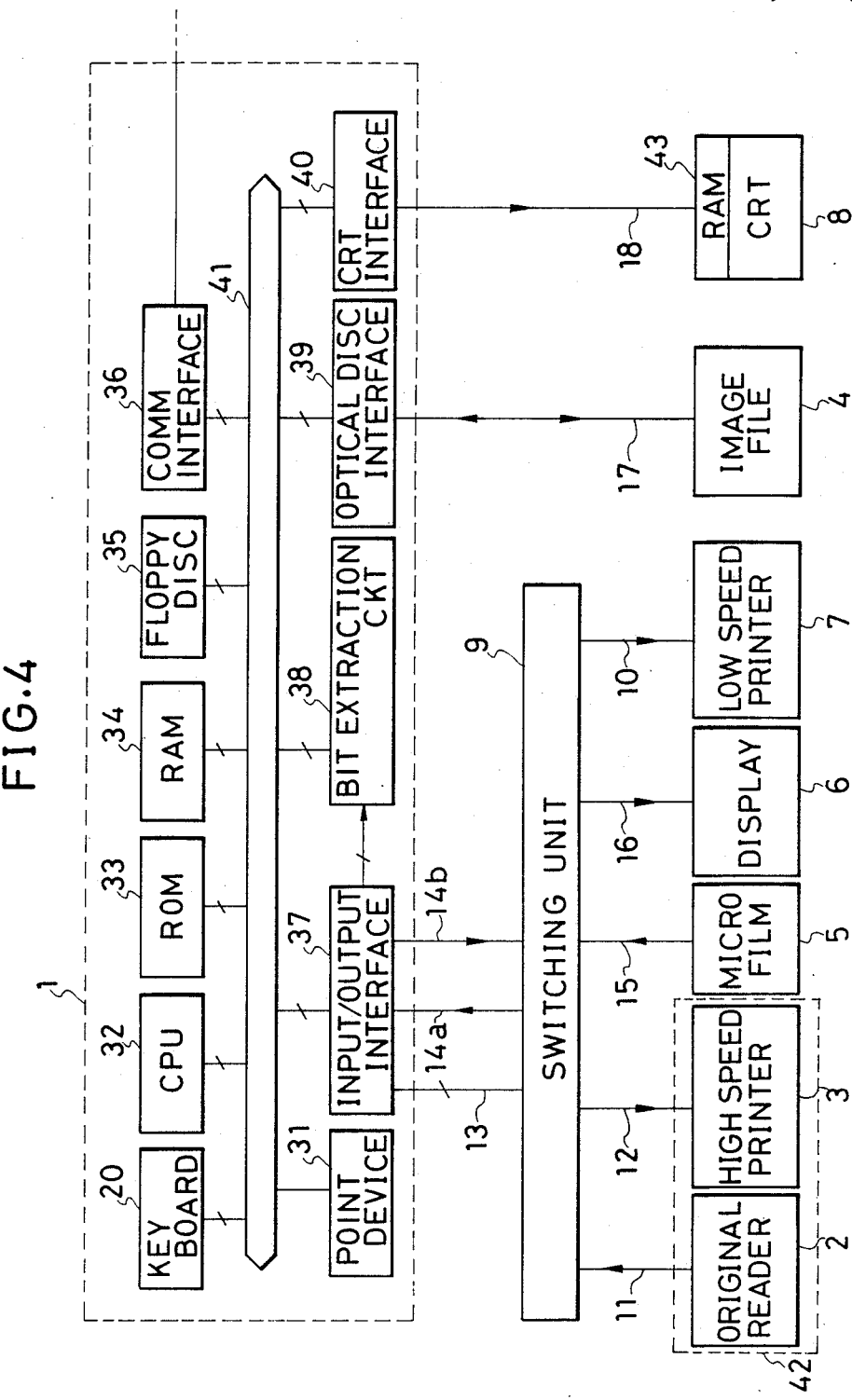
FIGS. 4 and 5, respectively, are block diagrams of the filing system according to an embodiment of the present invention.

FIG. 4 is a block diagram showing the circuit configuration of the image processing system shown in FIG. 3. Each block corresponding to one shown in FIG. 1 is designated by the same number in FIG. 2. Each block in the work station 1 will first be described. The operator inputs a control instruction of the system through the keyboard 20 or the point device 31. A Central processing unit (CPU) 32 comprises a microcomputer (e.g., 68000 provided by Motorola Semiconductor Products Inc.). A read-only memory (ROM) 33 stores a control program for the system. The CPU 32 performs a control operation in accordance with the program stored in the ROM 33. A random access memory (RAM) 34 is mainly used as a working memory of the CPU 32 or a page memory (main memory) for storing image signals which are exchanged between the respective input and output devices. An external memory 35 comprising a floppy disk stores a control program of the system or a data base for image retrieval from an image file to be described later. A communication interface 36 allows system expansion or information exchange with a similar system or a terminal device through a communication line such as a local area network or a digital facsimile communication line. An I/O port interface 37 allows information exchange between the work station 1 and the switching unit 9. A bit extraction circuit 38 extracts or interlaces bits from the image signal at a predetermined rate so as to display the CCD-read image at the CRT 8. An optical disk interface 39 is for information exchange with the image file 4. A CRT interface 40 is for information exchange with the CRT 8. A 16-bit bus 41 allows signal transfer between respective blocks in the work station 1. The cables 10 to 18 electrically connect the respective input/output devices as described above and transmit control signals and image signals. Arrows on the respective cables indicate the direction of image signal transfer. The control signals are transferred in both directions in each cable. As can be seen from FIG. 2, the cables 11, 12, 15, 16 and 10 connect the original reader 2 and the high speed printer 3 of a digital copying machine 42, the microfilm file 5, the soft display 6, and the small printer 7 to the switching unit 9. The switching unit 9 is connected to the work station 1 through the I/O interface 37 and the cables 13 and 14. The image file 4 and the CRT 8 are connected to the interfaces 39 and 40 of the work station 1 through the cables 17 and 18, respectively. A display RAM 43 stores image information to be displayed. An image signal inputted or outputted through the switching unit 9 is a serial signal and information on the bus 41 of the working station 1 is a parallel signal. Therefore, the I/O interface 37 has a serial-to-parallel register for fetching an image signal and a parallel-to-serial register for outputting an image signal.

An image signal outputted from the original reader 2 or the microfilm file 5 is supplied to the I/O interface 37 of the work station 1 through the switching unit 9 in units of lines. The I/O interface 37 converts the input serial image signal into 16-bit parallel image signals and transmits these signals onto the bus 41. The image signals on the bus 41 are sequentially stored in an image area of the RAM 34 in units of pages. The image signals stored in the RAM 34 in this manner are transmitted onto the bus 41 again and are transmitted externally through the communication interface 36. The image signals are also supplied to the image file 4 through the optical disk interface 39 and written in the optical disk. Alternatively, the image signals are transferred to the switching unit 9 through the I/O interface 37 and are selectively supplied to the high speed printer 3, the soft display 6 or the low speed printer 7 for image formation.

Image signals read out from the optical disk of the image file 4 are written in the RAM 34. Thereafter, the image signals are selectively transferred to the high speed printer 3, the soft display 6 or the low speed printer 7 through the I/O interface 37.

Image signals from the original reader 2 or the microfilm file 5 are selectively and directly transferred in a corresponding mode to the high speed printer 3, the soft display 6 or the low speed printer 7 through the switching unit 9 and without going through the work station 1. When only a copying operation is to be performed, the image file 4 or the CRT 8 is not required. Therefore, the copy operation is performed without using the work station 1 and by, for example, directly supplying image signals from the original reader 2 to the high speed printer 3 to allow a real time copying operation. This mode will be referred to as the bypass mode.

Control of transmission of image signals is performed by the CPU 32 in accordance with a control instruction inputted by the operator.

Figure 2:
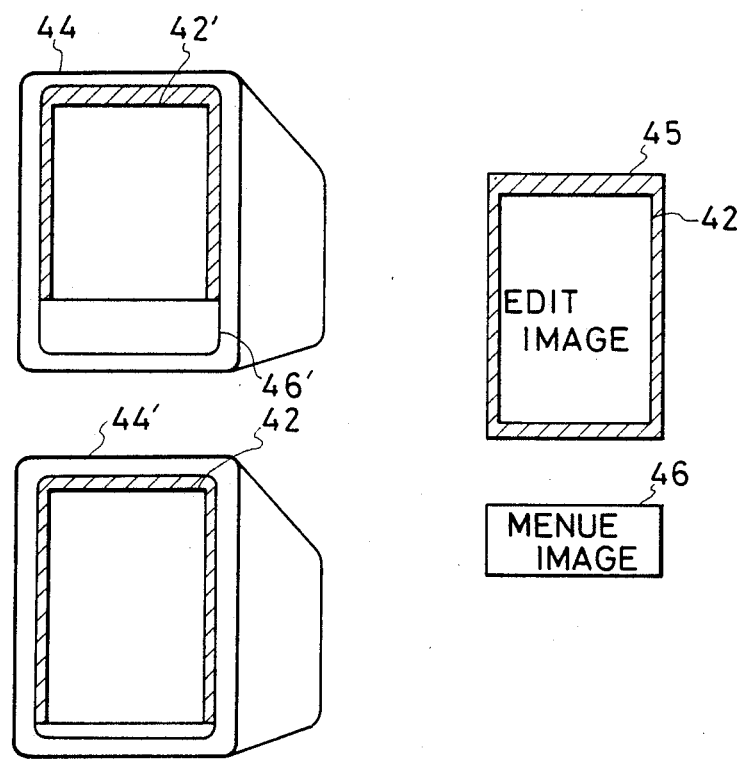
FIG. 2 is a perspective view showing a display state on a screen of a display apparatus according to the present invention.
Figure 5:
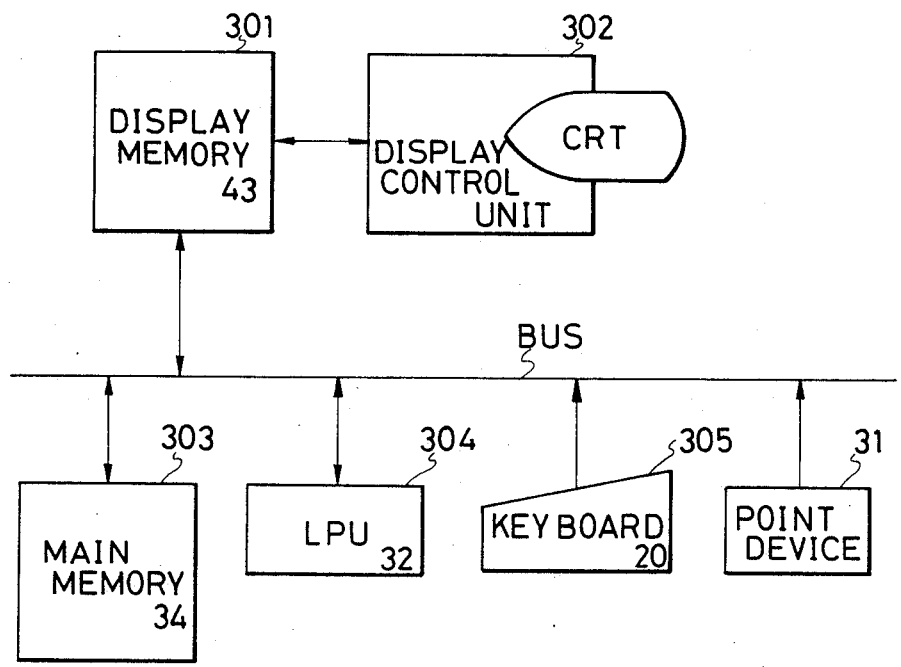

FIG. 5 is a partial block (corresponding to the B block of FIG. 8) associated with the CRT in FIG. 2. A display memory 301 stores data to be displayed on the display apparatus and corresponds to the RAM 43 in FIG. 4. A display control unit 302 (FIG. 7) supplies a memory address, i.e., a display address to the display memory 301 and receives from the display memory 301 the data to be displayed. This data is displayed on the screen of the CRT 8.

The RAM 43 stores image data which is not coded data but is arranged such that one pixel corresponds to one bit. The images scored in the RAM 43 include an original image from the original reader 2 of the copying machine of FIG. 3, a file image from the image file 4, a film image from the microfilm file 5, a command image for designating sentence and image editing, and a template image (basic figures such as a circle, an ellipse and a square) for graphic processing. When sentence data entered by a wordprocessor WP and data from a terminal data collector DC and a personal computer PC are supplied to a workstation $WS_1$ or $WS_2$ through a local data transfer line CNET, the transfer data can be stored in a main memory 303. The stored data in the main memory 303 can be registered in the image file 4 or may be stored as an editing image in the RAM 43 and displayed at the CRT 8.

The main memory 303 stores program data for editing the image data, transferring the image data from the original reader, registering the image data in the disk, and transferring the image data to the printers. The main memory 303 also stores the image data read by the image reader and the transfer image data. The user program is executed by a CPU 304 and the main memory 303, and the figure image data to be displayed on the screen of the CRT 8 is stored in the display memory 301. The operator enters a command at a keyboard 305 or with the point device 31 to perform editing (image size change, image extraction, image synthesis, image registration or the like).

Figure 6:
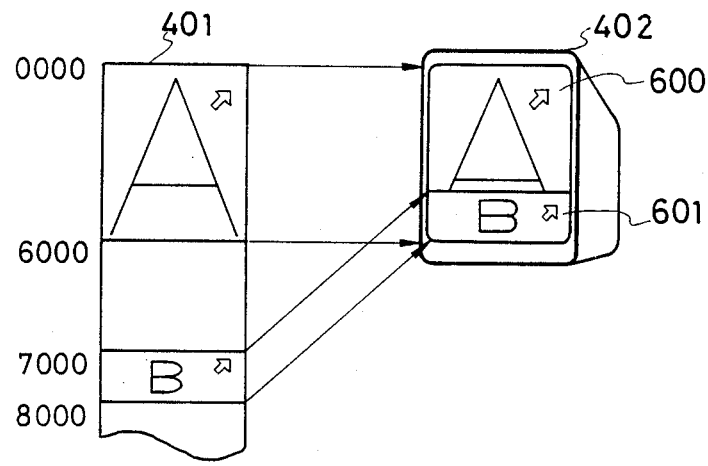
FIG. 6 shows a correspondence between the memory area and the display screen.

FIG. 6 is a representation showing a correspondence between the memory map of the display memory 301 and the screen on the CRT 8. Assume that only two display data A and B are present by way of simplicity. An address area 401 of the display memory 301 is an address space storing data A and B. The first display data A is stored at addresses 0000 to 6000, and the second display data B is stored at addresses 7000 to 8000. A screen 402 indicates that two display data stored in the address area 401 of the display memory 301 are overlapped on the single CRT screen. The display data B at addresses 7000 to 8000 is overlapped on the display data A at addresses 0000 to 6000.

Figure 7:
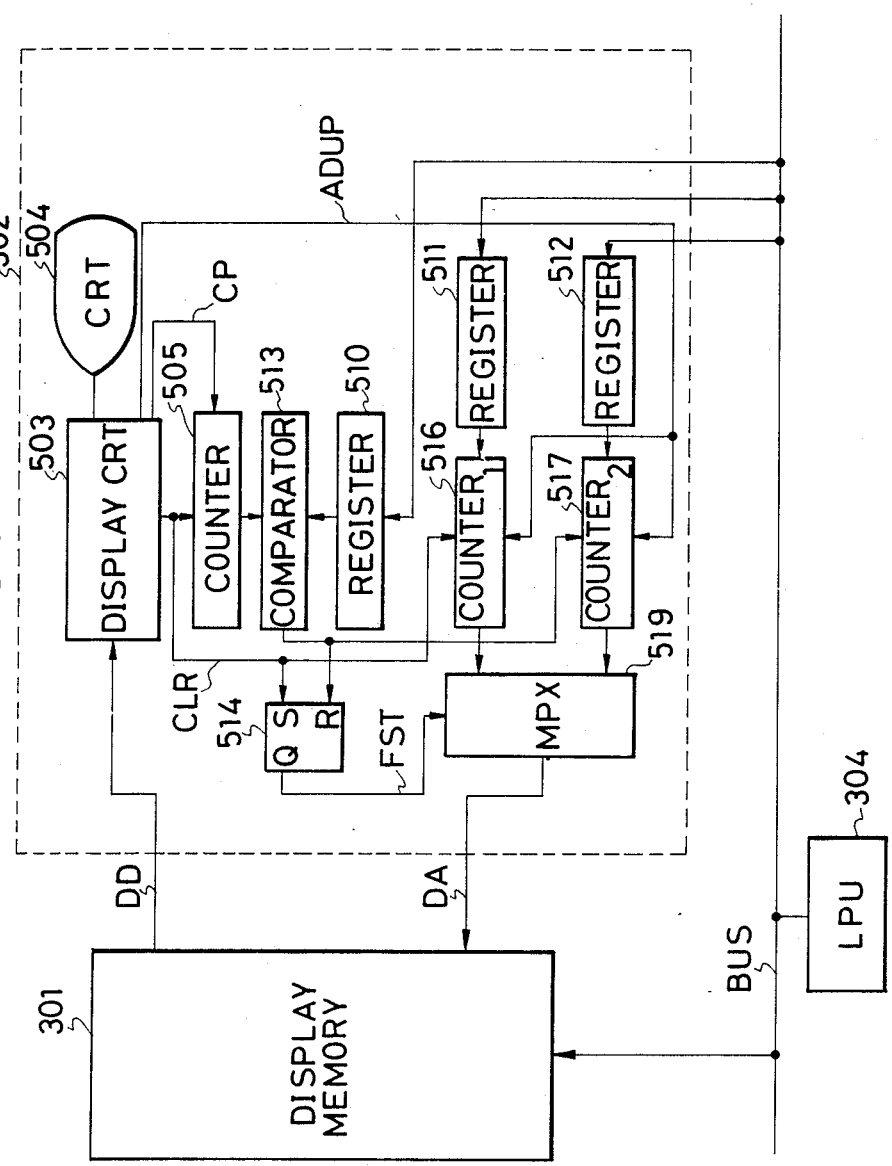
FIG. 7 is a circuit diagram of a display apparatus according to the embodiment of the present invention.
Figure 8:
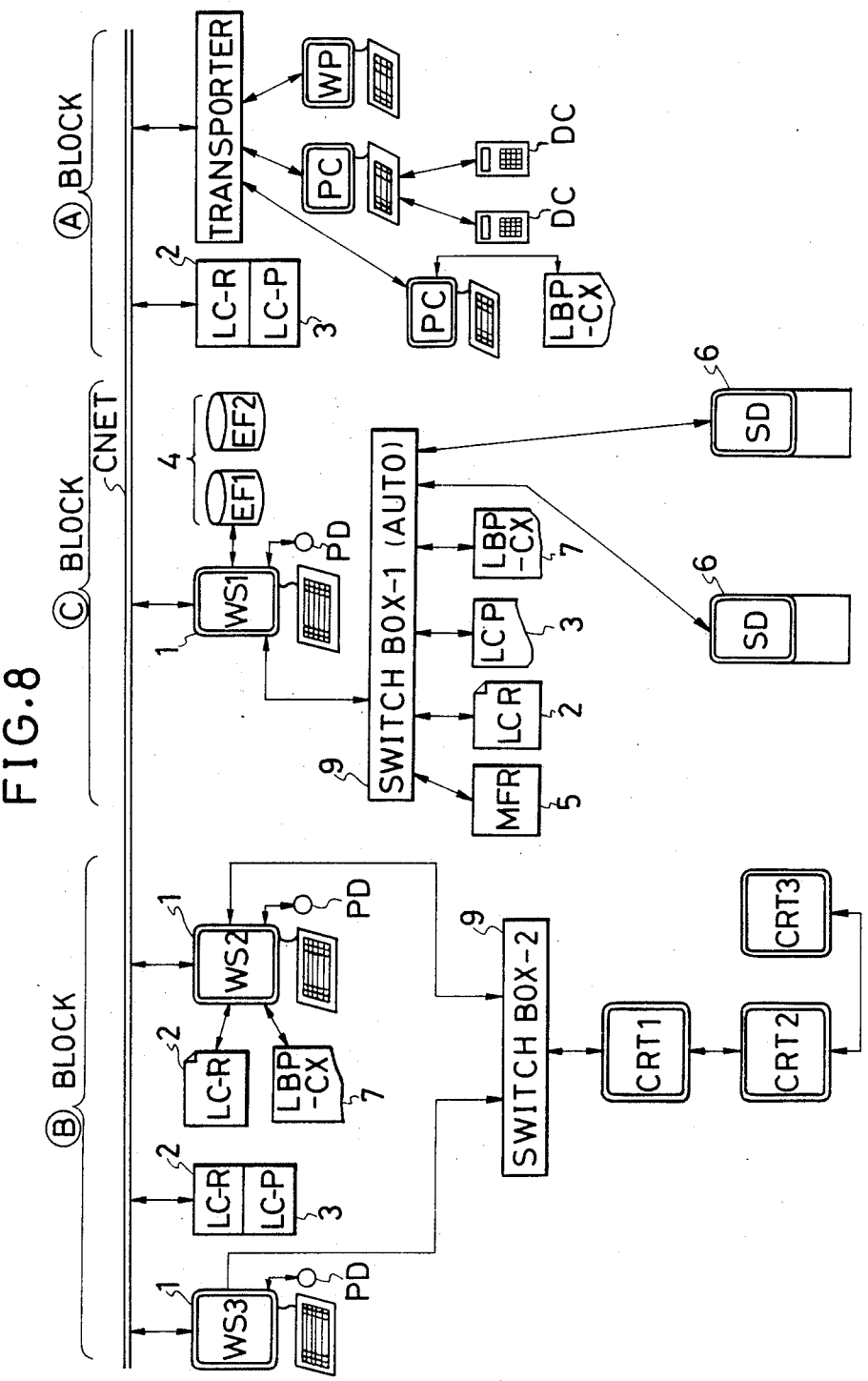
FIG. 8 shows a total data processing system.

FIG. 7 is a block diagram of the display control unit 302. A content accessed by an address signal DA from a display circuit 502 is read out, an display data is overlapped on a display data signal represented by DD. A display circuit 503 receives the display data signal DD and displays it at a CRT 504 A counter 505 stores a current line position of data displayed on the CRT 504. For example when the 10th raster is currently scanned on the CRT 504, a count of the counter 505 is 10. A clock pulse CP is used to increment the counter 505 every time the raster on the CRT 504 is scanned. A clock pulse CLR is generated when the 0th raster on the CRT 504 is scanned. The counter 505 is cleared in response to the clock pulse CLR. The CPU 304 writes address data in registers 510, 511 and 512 through an internal bus BUS in a software manner. The address data is determined by the keyboard 305 or the point device 31. In particular, when the point device 31 is used, the point device 31 shifts the cursor on the CRT to set a desired address.

The register 510 stores data representing from where the two display data are overlapped on the display screen. For example, when the two data are overlapped from the 600th raster on the CRT 504, a value of the register 510 becomes 600. The overlapped first image portion is not displayed. The register 511 stores address data (000) representing the first display data A in the display memory 301, and the register 512 stores the address data (7000) of the second display data. A comparator 513 compares the current raster position represented by the counter 505 with the overlapping start position represented by the register 510. When the count of the counter 505 is larger than the value of the register 510, a comparator 515 generates an output signal of logic "1". A flip-flop 514 is set in response to the CLR signal when the 0th raster on the CRT 504 is scanned, and generates an output signal FST of logic "1". In this case, a multiplexer MPX is controlled to generate the address signal DA so as to display the first display data stored in the display memory 301. When the signal from the comparator 513 goes to logic "1", the MPX is switched so that the flip-flop 514 generates a signal of logic "0", and the second display data is read out from the display memory 301 and is displayed. The counters 516 and 517 comprise address counters, respectively. The counter 516 is operated to reset the content of the register 511 in response to the CLR signal. The counter 517 is operated to set the content of the register 512 in response to the output of logic "0" from the comparator 513. These registers generate address signals of the first and second display data stored in the display memory 301, respectively. A signal line ADUP transfers a clock pulse for counting up the counters 516 and 517 and is synchronized with raster scanning on the CRT 504. A multiplexer (MPX) 519 generates the display address signal DA for displaying the content of the counter 516 in response to the FST signal of logic "1". The multiplexer (MPX) 519 generates the display address signal representing the content of the counter 517 in response to the FST signal of logic "0".

The editing image data A and the editing command data B (displaying an image magnification in characters) which are stored in addresses 0000 to 8000 of the RAM 43 are read out as data signals DD by the address counter 516 and 517 in synchronism with raster scanning. In this case, raster scanning is started from the 0th raster. The flip-flop 514 is set to supply the first image address from the register 511 to the address counter 516, so that address data "0" is set in the address counter 516. The address 0000 of the memory 301 is accessed through the MPX. Thereafter, every time the raster is scanned, the counter 516 is incremented by one. In this manner, the memory 301 is continuously accessed. When the raster subjected to overlapping of the first image data is scanned, the comparator 513 generates an output which resets the flip-flop 514. The flip-flop 514 then switches the MPX to stop generating the first image data. The second image data is then read out in response to the operation of the counter 517. When one-frame raster scanning is completed, addressing from the address 0000 in the memory area 401 is repeated. In this case, when the second image from the address 7000 is first displayed, the corresponding address data can be set in the register 511, and the first image address data from the address 0000 can be set in the register 512. When only the first image data A is displayed, addressing is performed such that data corresponding to the address 6000 is set in the register 510.

Unlike the first image data A, the second image data B displays an editing command (e.g., image magnification and image extraction ) in characters. When the operator designates a character by a cursor 601 under the control of the point device 31, a desired editing operation is performed under the control section 1 in FIG. 4. In this case, a cursor 600 is provided to designate a source extraction area of the image data A subjected to editing and a destination extraction area. When the cursor 600 designates these areas and the cursor 601 is used for extraction and magnification change designation, part of the image data A is extracted or blocked and is magnified in another location. The magnified image portion is then moved to a desired destination area. The cursor 601 shifts the image block of the image data B, and the cursor 600 shifts the image block of the image data A. The cursor image is moved in the memory 301. The cursors 600 and 601 can be replaced with a single cursor. In this case, the single cursor can move blocks of the image data A and B. Even if only the image data A is displayed, cursor display is always performed. The partial images of the image data A and B in the memory 301 having the cursor image are deleted. However, when the cursor is shifted, the original partial images of the image data A and B are restored in the memory 301. When the single cursor is used, the cursor jumps from the area of the image data A to the area of the image data B and vice versa at the boundary of the overlapping position in the memory 301.

When the data to the register 510 continuously changes for every frame (every scanning of all rasters), the overlapping position can continuously change. While the operator observes the change on the screen, the image data B can be removed from the CRT screen.

When the scanning line varies from the 0th raster to the number represented by the content of the register 510, the first display data (starting from the address represented by the register 511) stored in the display memory 510 is displayed. Otherwise, the second display data (starting from the address represented by the register 512) stored in the display memory 301 is displayed. When the register 510 is set at a desired value, the overlapping position can arbitrarily change.

It should be noted that the image data B also comprises a file and printer menu for designating a transfer destination and a storage destination.

The first image data A may comprise read image data, and the second image data B comprises sentence image data entered by the wordprocessor WP or the like. The second image data B can be shifted in a proper position of the first image data A, and a combined result can be monitored in the same manner as described above.

All displayed images on the screen 402 can be printed out at the printers 3 and 7. Only the data A from the address 0000 to 6000 can be read out and printed out.

Figure 9:
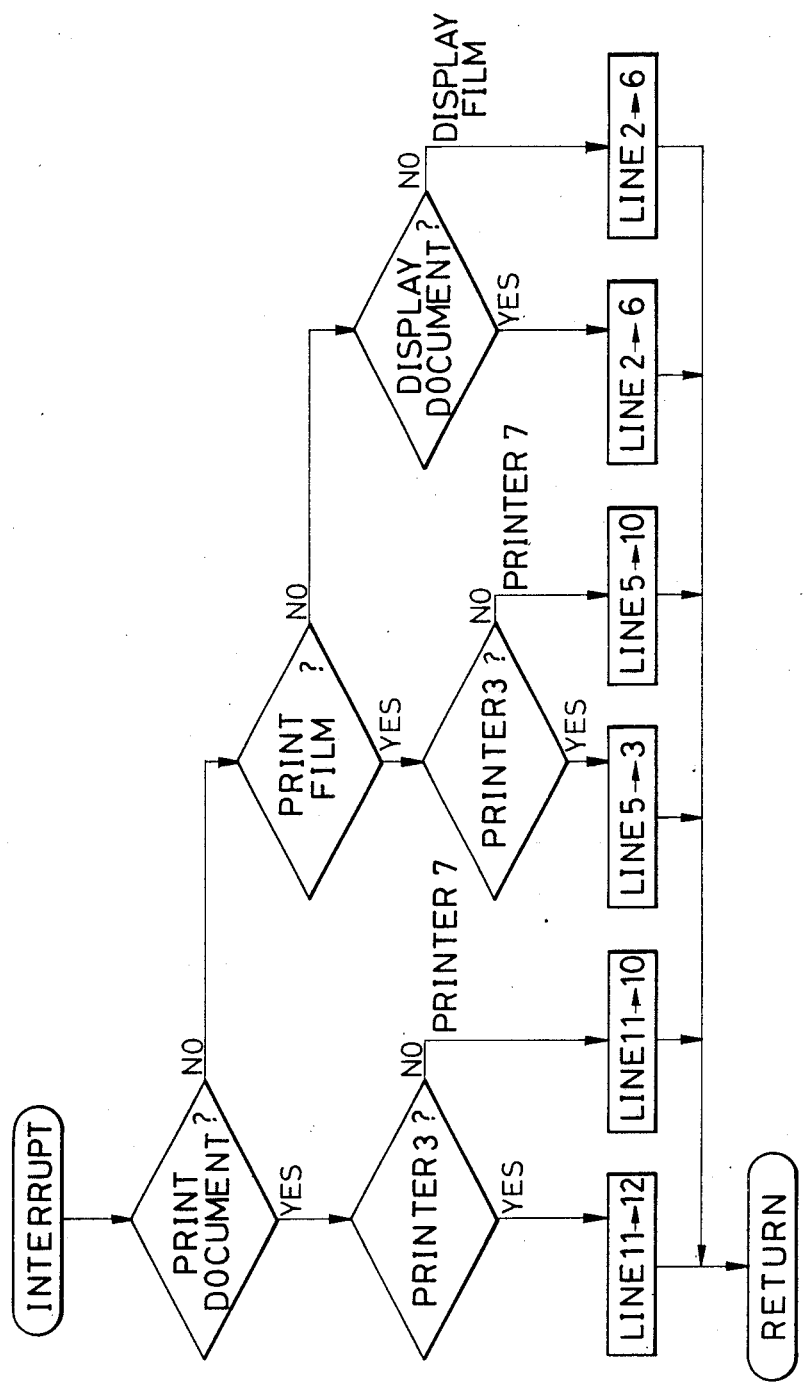
FIG. 9 is a flow chart for explaining the operation in the bypass mode.

When the image data A and B are displayed so as to edit the image data A, data is exchanged between the memory and the display, so that the original reader 2 is operated to directly supply the read data from the reader 2 to the printer 3 in accordance with the bypass mode control by the switching unit 9. The copy operation can be performed independently of image editing. In this manner, a copy can be obtained before image editing is completed. For example, as shown in FIG. 9, when a copy mode command is entered at the keyboard 20, the interrupt program is executed under the control of the CPU 32 (FIG. 4). The CPU connects the image data line and the control data line of the switching unit 9 in accordance with the copy mode command. When the data from the reader 2 is copied, the copy start instruction is entered by the switch 22 and the key 25, and the copy number data is entered from the panel 21. When the copy is completed, the channel latch of the switching unit 9 in the bypass mode is released by the copy end signal. The channel can be manually set/reset by the key on the panel 21 of the reader 2.

What I claimed is:

1. A display apparatus comprising:
   memory means for storing therein image data to be edited and command image data representing a command for editing the image data to be edited, said image data and said command image data being stored in first and second memory areas, respectively;
   display means for displaying the image data and the command image data stored in said memory means, said display means having first and second display areas;
   control means adapted to display a part of the image data on said first display area and to display the command image data, in place of the remaining image data, on said second display area, said control means including a register for storing data corresponding to a display address of a boundary between said first display area and said second display area, said control means adapted to stop reading image data from said first memory area when a display address of the image data is coincident with data corresponding to a display address of the boundary during display of the image data, and further adapted to read the command image data from said second memory area and display same on said display means; and
   erasure means for changing data corresponding to a display address of the boundary stored in said register and erasing the command image displayed on said display means.

2. A display apparatus according to claim 1 wherein said display means displays a document image read by document reading means.

3. An apparatus according to claim 1, wherein said display means displays data by means of raster scan, and wherein said control means includes count means for counting the number of the raster scan, and wherein said control means controls read-out of data from said first and second memory areas in accordance with a value of said count means.

4. An apparatus according to claim 3, wherein said control means executes an interrupt program for controlling said changing means in accordance with mode selection by said selecting means.

5. An apparatus according to claim 1, wherein said control means is adapted to display the remaining image data on said second display area when the command image is erased.

6. An apparatus according to claim 1, wherein said erase means is adapted to change a display address of the boundary continuously.

7. A display apparatus comprising:
   memory means for storing first and second image data in predetermined first and second memory areas;
   means for displaying the first and second image data stored in said memory means;
   control means for controlling read-out of the first and second image data from said memory means so as to overlay the first image data on said second image data in accordance with the memory areas when the first and second image data are overlapped and displayed.

8. A display apparatus according to claim 7, wherein said display means displays a document image read by document reading means.

9. A display apparatus according to claim 7, wherein said plurality of image data to be displayed includes image data to be editing and command image data representing a command for editing the image data to be edited.

10. A display apparatus according to claim 7, further comprising means for shifting at least one of the image data displayed on said display means at a desired area on said display means.

11. An apparatus according to claim 7, wherein the first image data represents a command for editing the second image data.

12. An image processing system comprising:
reading means for reading a document;
display means for displaying the document image read by said reading means;
edit means for editing the document image displayed on said display means;
printing means for printing the document image read by said reading means and the document image edited by said edit means;
switching means for switching among a first transmission line for transmitting an image outputted from said reading means to said edit means, a second transmission line for transmitting an image outputted from said reading means to said printing means, and a third transmission line for transmitting an image outputted from said edit means to said printing means;
selecting means for selecting a mode for printing an image read by said reading means by means of said printing means; and
control means for controlling said switching means to connect said reading means with said printing means through said first transmission line so as to print an image read by said reading means by means of said printing means during an editing operation of said edit means without transmitting the image outputted from said reading means via said edit means.

13. An image processing system according to claim 12, further comprising selection means for selecting energization or deenergization of said conrol means.

* * * * *

UNITED STATES PATENT AND TRADEMARK OFFICE
CERTIFICATE OF CORRECTION

PATENT NO. : 4,920,337
DATED : April 24, 1990
INVENTOR(S) : Kuo

It is certified that error appears in the above-identified patent and that said Letters Patent is hereby corrected as shown below:

COLUMN 2:

Line 47, "flopply disk" should read --floppy disk--.

COLUMN 4:

Line 12, working station 1" should read --work station 1--.

COLUMN 5:

Line 43, "CRT 504" should read --CRT 504.--.

Line 45, "example" should read --example,--.

Signed and Sealed this

Twenty-third Day of October, 1990

Attest:

HARRY F. MANBECK, JR.

*Attesting Officer*  *Commissioner of Patents and Trademarks*